(12) United States Patent
Ben-Natan et al.

(10) Patent No.: US 10,180,895 B2
(45) Date of Patent: *Jan. 15, 2019

(54) IDENTITY PROPAGATION THROUGH APPLICATION LAYERS USING CONTEXTUAL MAPPING AND PLANTED VALUES

(71) Applicant: International Business Machines Corporation, Armonk, NY (US)

(72) Inventors: Ron Ben-Natan, Lexington, MA (US); Leonid Rodniansky, Allston, MA (US)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/135,738

(22) Filed: Apr. 22, 2016

(65) Prior Publication Data

US 2016/0239406 A1 Aug. 18, 2016

Related U.S. Application Data

(63) Continuation of application No. 14/058,740, filed on Oct. 21, 2013, now Pat. No. 9,390,083, which is a
(Continued)

(51) Int. Cl.
*G06F 17/30* (2006.01)
*G06F 11/36* (2006.01)
(Continued)

(52) U.S. Cl.
CPC ...... *G06F 11/3664* (2013.01); *G06F 11/3672* (2013.01); *G06F 17/2705* (2013.01);
(Continued)

(58) Field of Classification Search
None
See application file for complete search history.

(56) References Cited

U.S. PATENT DOCUMENTS 8,141,100 B2 3/2012 Ben-Natan et al.
8,583,666 B2 11/2013 Ben-Natan et al.
(Continued)

FOREIGN PATENT DOCUMENTS

CN 101005503 A 7/2007
WO WO 2004/032562 A1 4/2004

OTHER PUBLICATIONS

International Search Report and Written Opinion dated May 24, 2012 for International Application No. PCT/EP2011/068887, 9 pages.

(Continued)

*Primary Examiner* — Amresh Singh
(74) *Attorney, Agent, or Firm* — Stephen J. Walder, Jr.; David B. Woycechowsky

(57) ABSTRACT

Mechanisms are provided for propagating source identification information from an application front-end system in an application layer to a data layer inspection system associated with a back-end system. An incoming user request is received, at the data layer inspection system, from a gateway system associated with the application front-end system. One or more outgoing statements targeting a back-end system are received at the data layer inspection system. The data layer inspection system accesses a mapping data structure based on the one or more outgoing statements to thereby correlate the one or more outgoing statements with the incoming user request. The data layer inspection system retrieves source identification information associated with the incoming user request based on the correlation of the one or more outgoing statements with the incoming user request. The data layer inspection system performs a data layer inspection operation based on the source identification information.

14 Claims, 5 Drawing Sheets

Related U.S. Application Data continuation of application No. 13/761,315, filed on Feb. 7, 2013, now Pat. No. 8,589,422, which is a continuation of application No. 12/962,745, filed on Dec. 8, 2010, now Pat. No. 8,583,666.

(51) Int. Cl.
*H04L 29/06* (2006.01)
*H04L 29/08* (2006.01)
*G06F 17/27* (2006.01)

(52) U.S. Cl.
CPC .. *G06F 17/30091* (2013.01); *G06F 17/30424* (2013.01); *G06F 17/30917* (2013.01); *H04L 67/02* (2013.01); *H04L 67/42* (2013.01); *H04L 69/22* (2013.01); *H04L 69/32* (2013.01); *H04L 69/324* (2013.01); *H04L 69/329* (2013.01); *H04L 69/28* (2013.01)

(56) References Cited

U.S. PATENT DOCUMENTS

| | | | |
|---|---|---|---|
| 8,589,422 | B2 | 11/2013 | Ben-Natan et al. |
| 2002/0068582 | A1 | 6/2002 | Zawislak |
| 2003/0140151 | A1 | 7/2003 | Daenen et al. |
| 2004/0044607 | A1* | 3/2004 | Hedrick, Jr. .......... G06Q 10/10 705/35 |
| 2006/0026286 | A1 | 2/2006 | Lei et al. |
| 2006/0156023 | A1 | 7/2006 | Luo et al. |
| 2007/0118534 | A1* | 5/2007 | Hayes ............... G06F 17/30306 |
| 2007/0199056 | A1 | 8/2007 | Bhatia et al. |
| 2008/0016062 | A1 | 1/2008 | Drescher |
| 2008/0175222 | A1 | 7/2008 | Barnea et al. |
| 2010/0132024 | A1 | 5/2010 | Ben-Natan et al. |
| 2012/0150880 | A1 | 6/2012 | Ben-Natan et al. |
| 2013/0151542 | A1 | 6/2013 | Ben-Natan et al. |
| 2014/0222842 | A1 | 8/2014 | Ben-Natan et al. |

OTHER PUBLICATIONS

U.S. Appl. No. 11/642,432, 4 pages.
U.S. Appl. No. 12/962,745, 2 pages.
U.S. Appl. No. 13/761,315, 2 pages.
U.S. Appl. No. 14/058,740, 2 pages.
"Secerno DataWall with F5 BIG-IP ASM Deployment Guide", Issue 3.2, Dec. 11, 2008, http://www.secerno.com/download_files/technology_alliances/F5_and_Secerno,pdf, 19 pages.
"Service Oriented Architecture (SOA) in the Real World", Aug. 17, 2007, 196 pages.
Botzum, Keys et al., "IBM WebSphere Developer Technical Journal: Database identity propagation in WebSphere Application Server V6", IBM Corporation, Jun. 15, 2005, http://www.ibm.com/developerworks/websphere/techjournal/0506_barghouthi/0506_barghouthi.html, 23 pages.

* cited by examiner

IDENTITY PROPAGATION THROUGH APPLICATION LAYERS USING CONTEXTUAL MAPPING AND PLANTED VALUES

This application is a continuation of application number 14/058,740, filed Oct. 21, 2013, status allowed.

BACKGROUND

The present application relates generally to an improved data processing apparatus and method and more specifically to mechanisms for identity propagation through application layers using contextual mapping and planted values.

Modern information processing environments are experiencing a trend from the traditional client-server model to an application-server model. While the client-server model categorizes information resources as services to a client, an application-based architecture allows each application to perform specific and/or specialized portions of processing before handing a transaction or data stream off to a successive processing tier. An application-server model may exhibit a so-called multi tier arrangement or architecture. In a multi-tier arrangement, each tier is responsible for performing a particular aspect of processing. Tiers communicate by passing or transmitting data, often according to a predetermined protocol or data structure. A business transaction is therefore passed between tiers, which may be successive layers or nodes in the processing stream. According, each tier, or "layer," receives a transaction from a preceding layer.

Each tier/layer may perform particular functions, such as database queries, XML parsing, tunneling, protocol mapping, network transport, or GUI (graphical user interface) operations, for example. At each tier, attributes of the transaction or data stream are communicated to the next tier. However, certain attributes may be suppressed or omitted if those attributes are deemed unnecessary at the successive tier. Therefore, in a multi-tier arrangement, while scaling, information scope, and function consolidation may be improved, certain attributes of the transaction or information stream may not be propagated as readily as in conventional client server arrangements. Operations or functions that expect certain attributes available at a particular layer may encounter difficulty (i.e. unavailability) if they rely on that attribute.

One set of examples in which information is lost between operations performed at different tiers/layers of an application-server model based system are security functions, such as audit trails or the like. Almost all security functions are based on a credential. Audit trails key on the identity of a user or client machine (e.g., produce a report showing all activity performed by the user or client machine), access control keys on the identity (e.g., user X should not be allowed to access data Y), and the like.

In some cases, the security function is provided by the same layer that provides the identity layer. For example, when a user connects directly to a database there is a user name that is used to log onto the database. The same user name is also used to define privileges in the database system and the same name appears in the audit trail generated by audit security mechanisms. This is true regardless of whether the database itself is the system enforcing access control rules and performing the auditing or an external security system performs these functions. Because the user name used for the security functions is managed by the database security tier, it is meaningful to the security operator, who defines privileges or reviews the audit trail.

However, there are cases in which the security function is provided at one tier while the identity is provided by another tier. A very common case involves application servers that use a database as their back-end. In such cases, the application is the tier responsible for managing the identities. A user logs onto the application and provides, for example, a user name and a password. The application will typically utilize a database on the back-end to store and manage the data used or accessed via the application. The application server uses connections to the database.

In client/server architectures there is usually a connection to the database for every user and often the credential used to log onto the application is also used to generate the connection to the database, i.e. for every user of the application there is also a user at the database level. However, in the much more common application-server based architecture, this is not true. Instead, the application server maintains a pool of connections to the database. These connections are all created when the application server first starts and they all use a single functional account, i.e. the connections are all associated with a single functional identifier for the application front-end without distinguishing between users of the application front-end. These connections are reused by all user sessions, i.e. multiplexing is used. That is, when a user logs onto the application front-end, a session is created with the application front-end and the application front-end gets a connection from the database's connection pool and assigns it to the session. When the session ends, the connection is released back to the pool and may be reused by the application front-end for another session. This is done to increase performance and reduce overhead.

From a security point of view, however, this connection pool mechanism causes a serious problem. The identity of the user is lost from the viewpoint of the database layer, i.e. the user identity is not passed to the database back-end, and only exists at the application layer, i.e. at the application front-end. For example, if one were to look at an audit trail produced by an audit mechanism operating at the database layer, such as an audit mechanism of the database itself or a Database Activity Monitoring (DAM) system, then all activity is shown to have been performed by the entity logged onto the database, i.e. the functional account of the application which is identified by a functional identifier. However, what a human auditor, or automated security mechanism wants to be able to see in the audit trail is which end-user of the application layer caused the particular database query to be issued and therefore, which user was able to access certain sensitive data. The audit trail provides little useful information from a security point of view because the "real identity" of the end-user is not propagated through the application layer. While an application layer audit trail could be used, it is often a data-level audit trail that is required for particular security mechanisms and this can only be performed at the database layer.

SUMMARY

In one illustrative embodiment, a method, in a data processing system, is provided for propagating source identification information from an application front-end system in an application layer to a data layer inspection system associated with a back-end system. The method comprises receiving, at the data layer inspection system, an incoming user request from a gateway system, in the application layer, associated with the application front-end system. The method further comprises receiving, at the data layer inspection system, one or more outgoing statements targeting the back-end system and being generated by the application front-end system based on the received incoming user request. Moreover, the method comprises accessing, by the data layer inspection system, a mapping data structure based on the one or more outgoing statements to thereby correlate the one or more outgoing statements with the incoming user request. In addition, the method comprises retrieving, by the data layer inspection system, source identification information associated with the incoming user request based on the correlation of the one or more outgoing statements with the incoming user request. Additionally, the method comprises performing, by the data layer inspection system, a data layer inspection operation based on the source identification information.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
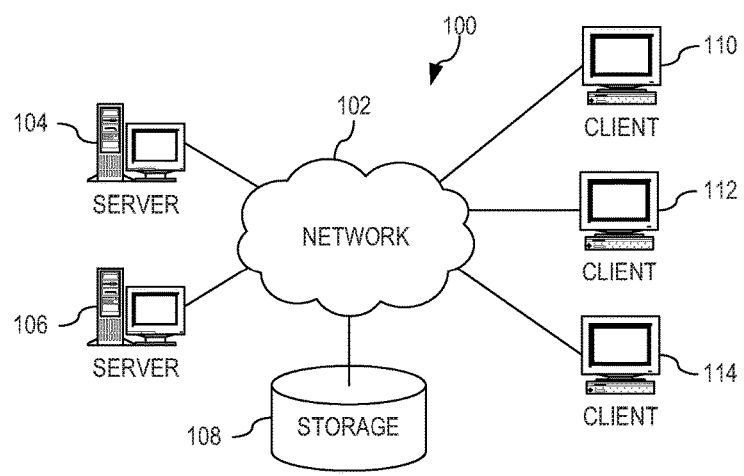
FIG. 1 depicts a pictorial representation of an example distributed data processing system in which aspects of the illustrative embodiments may be implemented.

The illustrative embodiments provide mechanisms for identity propagation through application layers using contextual mapping and planted values. The mechanisms of the illustrative embodiments solve the issues noted above by providing a non-intrusive matching mechanism for identity propagation, i.e. a matching mechanism that does not require changes to application front-end code. Moreover, the matching mechanism of the illustrative embodiments is precise since it uses inserted or planted unique values that are easily identifiable and are not values that may appear from multiple database queries.

The illustrative embodiments operate on the basic premise that it is possible to manipulate the incoming user based requests to the application layer, plant uniquely identifiable values into these requests, and monitor the impact on the outgoing database requests, e.g., the SQL statements generated by the application layer and sent to the database layer. In a learning mode of operation, the mechanisms of the illustrative embodiments utilize this matching of unique values in the incoming user requests to the application tier/layer with the same unique values in the outgoing database requests as a way of learning the relationship between certain types, or patterns, of incoming user requests and the resulting outgoing database requests. Once this learning is accomplished, the results of the learning are used to perform mapping during runtime so as to generate database layer audit trails, i.e. audit trails generated by an audit mechanism operating at the database layer rather than an application layer, having user identity information. That is, during runtime operation, the unique value planting mechanisms are not used but instead the learned mapping of incoming user request to outgoing database request(s) or statement(s) is used to correlate an incoming user request with subsequent outgoing database request(s)/statement(s) and a corresponding audit trail having the user identifier for the user issuing the original incoming user request is generated. This audit trail may then be used by an auditor to identify which user was able to access sensitive data on the database system.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
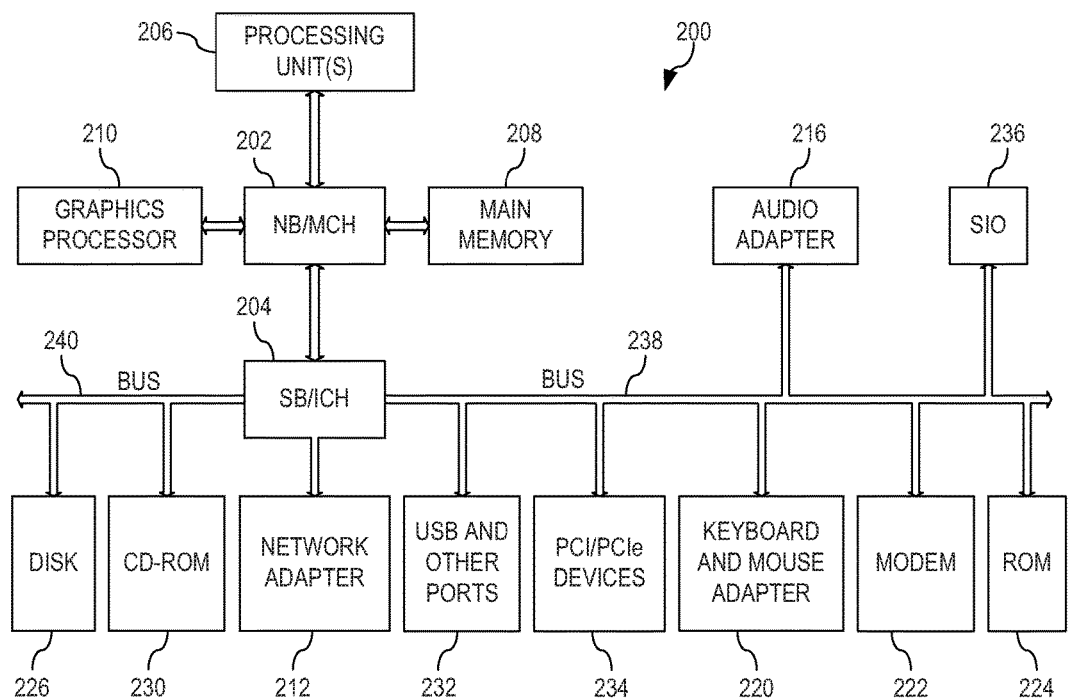
FIG. 2 is an example block diagram of an example data processing system in which aspects of the illustrative embodiments may be implemented.

As will be appreciated, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® 7 (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

With reference again to FIG. 1, a user of a client machine, such as client 110, may log onto an application front-end of an application-server system by accessing the application front-end, which may be hosted on a server, such as server 104 or 106, for example. The user may use a web browser, applet, or the like, provided on the client machine 110 to access the application front-end and log onto the application front-end by providing a user identifier and corresponding security information, e.g., a user name and password. The application front-end may then perform operations to generate a session to be associated with the user's interaction with the application front-end, e.g., generate a session token to be associated with the connection between the user's client machine 110 and the application front-end on the server 104.

In response to user requests, e.g., hypertext transfer protocol (HTTP) requests, for access to data stored on a back-end database associated with the application front-end, such as network attached storage 108 or other database associated with the application front-end server 104, the application front-end obtains a connection from a connection pool of the database, e.g., database 108 in FIG. 1 for purposes of this example, and uses the obtained connection to send the resulting database query requests/statements to the database 108 and to receive responses back from the database 108. As discussed above, these connections are only associated with the functional identifier of the application front-end and the user identity information, e.g., username, used by the application front-end is not passed along to the database 108.

The illustrative embodiments provide a correlation mechanism that allows auditing to be performed at a data layer, e.g., at the database back-end, while still being able to correlate the audit information obtained by the audit mechanisms with user identification information maintained at the application layer and which is typically lost when accessing the data layer. The mechanisms of the illustrative embodiments include mechanisms for intercepting incoming user requests, inserting unique values into the intercepted incoming user requests, and tracking these unique values in outgoing requests/statements sent to the data layer, e.g., the database back-end system. This tracking and correlation of incoming requests to outgoing requests/statements allows a mapping to be generated which can then be used by additional mechanisms used at runtime to collect audit information at the data layer. That is, the mapping may be used to correlate requests sent to the database back-end system with requests received by the application layer, and then to user credentials. In this way, the auditing mechanisms operating at the data layer may be informed of application layer user credential information corresponding to accesses of information stored in the database back-end system.

The mechanisms of the illustrative embodiments have two modes of operation (or phases). In a first mode of operation (or phase), i.e. the learning mode of operation, the mechanisms of the illustrative embodiments operate to learn patterns of incoming user requests and corresponding outgoing requests/statements sent to the database back-end system. The mapping of these patterns is used to generate a specification, or set of specifications, that may be used during a second mode operation, i.e. the runtime mode of operation. During the runtime mode of operation, the specification(s) is/are used to identify outgoing requests sent to the database back-end system and correlate these outing requests with incoming user requests received by the application layer front-end system. The incoming user requests include a session identifier which can then be used to correlate the incoming user request with a particular user identifier. The user identifier can thus, be associated with the outgoing requests sent to the database back-end system for auditing or other tracking purposes.

Figure 3:
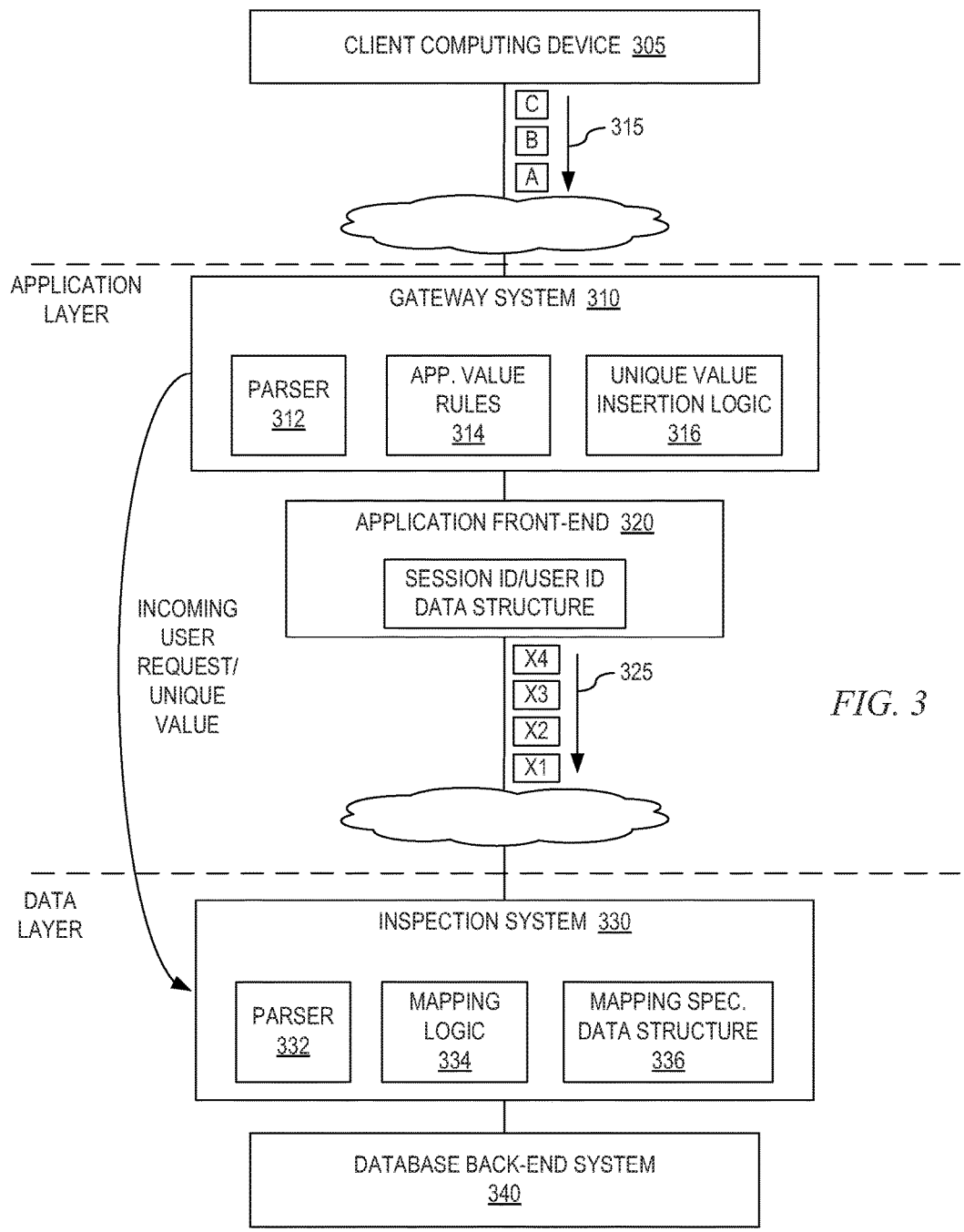
FIG. 3 is an example block diagram of a system for generating a mapping specification for mapping front-end incoming user requests to outgoing back-end requests in accordance with one illustrative embodiment.

FIG. 3 is an example block diagram of a system for generating a mapping specification for mapping front-end incoming user requests to outgoing back-end requests in accordance with one illustrative embodiment. The operational elements shown in FIG. 3, and other block diagrams hereafter, may be implemented as software, hardware, or any combination of software and hardware. In one illustrative embodiment, the operational elements in FIG. 3 are implemented as software instructions executing on one or more computing devices. Data structures and the like shown in FIG. 3 may be stored in data storage devices within or associated with these one or more computing devices. Depictions of networks are intended to represents data communication networks which may be of the same or different types and may comprise more than one data communication network. The data communication networks may be local area networks, wide area networks, the Internet, or any other known or later developed type of data communication network.

The following description will assume that the mechanisms of the illustrative embodiments are applied to accesses to a back-end database system. However, it should be appreciated that the mechanisms of the illustrative embodiments are not limited to such. Rather, the illustrative embodiments may be used with any system in which requests to a front-end application are processed to generate requests/statements that are sent to a back-end system and thus, a mapping of incoming requests to outgoing requests/statements is desirable.

In addition, it should be appreciated that while the following description will assume that Structured Query Language (SQL) statements are generated by the front-end application based on incoming user requests (which may be HTTP requests or the like), the illustrative embodiments are not limited to such. To the contrary, any system in which incoming requests are processed to generate a set of outgoing requests, regardless of the language or protocols used, may implement the mechanisms of the illustrative embodiments.

As shown in FIG. 3, the mechanisms of the illustrative embodiments further includes a gateway system 310 used for intercepting incoming user requests 315 from the client computing device 305 to the application front-end 320 and an inspection mechanism 330 for inspecting outgoing database requests/statements 325 sent from the application front-end 320 to the database back-end 340. The gateway system 310, during a learning mode of operation, intercepts the incoming user requests 315 and parses the protocol of the incoming user request 315 using the parser 312. The parsed incoming user request 315 is then processed to identify where application values are present, e.g., account numbers, names, etc. For example, the gateway system 310 may have an application value rules data structure 314, or the like, that identifies application values, e.g., the variable names, data format location, or the like, of interest and the gateway system 310 may apply these rules 314 to the parsed incoming user requests 315 to identify the application values in the incoming user request from the client computing device 305.

The unique value insertion logic 316 of the gateway mechanism 310 modifies these values by inserting or "planting" uniquely identifiable values (e.g., randomly generated large strings, SHA-1 values, or the like) into the incoming user requests to replace the account numbers, names, or the like. During a learning mode of operation, the content of the requests are not of importance, only the ability to match incoming user requests with the outgoing requests/statements generated by the application front-end 320. Thus, values that will typically be passed through the application front-end 320 to the database back-end system 340 may be identified using the parser 312 and application value rules data structure 314 and may be replaced with uniquely identifiable values.

These uniquely identifiable values are generated such that, within a predetermined period of time (which may be selected such that the period of time is relatively large compared to the amount of time of a typical session established with the application front-end 320), the uniquely identifiable value will not be repeated. Each incoming user request will have its own uniquely identifiable value(s) such that it can be uniquely distinguished from other requests being handled by the application front-end 320 within the predetermined period of time.

The modification of the application values to be uniquely identifiable values is a key aspect of the learning mode of operation of the mechanisms of the illustrative embodiments. It should be appreciated that there are systems, e.g., Oracle Secerno, available from Oracle Corporation, or SecureSphere available from Imperva, that perform matching between incoming user requests and outgoing database requests/statements. These systems extract timestamps and values from the incoming user requests and match them to similar values in the outgoing database requests/statements. If values are seen on both the incoming user request and on the outgoing database requests/statements, then a match can be made and the system can infer that this particular incoming user request caused the database request(s)/statement(s) to be generated.

The Oracle Secerno and Imperva SecureSphere systems, and those like them, are very inaccurate in that the values received in the incoming user requests do not often match the values in the outgoing database requests/statements because of application-layer processing. Moreover, timing can be an issue since the values are not unique and more than one incoming user request can have the same values that may be included in the outgoing database requests/statements. That is, values in the incoming user requests are often not included in the outgoing database request(s)/statement(s) or are changed in some manner such that they cannot be match appropriately. Furthermore, there is an assumption with regard to timing, e.g., a first arriving incoming user request will match to a first outgoing database request/statement that has a matching value. However, if more than one incoming user request is being handled by the application-layer, as is common, then it is possible that the outgoing database requests/statements may be intermingled with regard to timing and may have common values, leading to a mismatch where an outgoing database request/statement that is actually associated with a first incoming user request is matched to a second incoming user request erroneously.

Thus, with the mechanisms of the illustrative embodiments, uniquely identifiable values are generated and inserted or "planted" into the incoming user requests 315 before they are passed through the application-layer processing performed by the application front-end system 320. A record of these uniquely identifiable values, and the corresponding incoming user request, which includes a session identifier, is communicated by the gateway system 310 to the inspection system 330. In this way, if the application-layer processing outputs corresponding outgoing database requests/statements 325, then the uniquely identifiable values will be included in these outgoing database requests/statements 325 such that they may be uniquely matched even if the application-layer is processing multiple incoming user requests from the same or different client computing devices 305. In other words, the problems associated with the assumptions of the known Oracle Secerno, Imperva SecureSphere, and similar known matching mechanisms are eliminated by the mechanisms of the illustrative embodiments. For example, if there are multiple requests all accessing a same item number, using the mechanisms of the illustrative embodiments, the item number is replaced with a uniquely identifiable value in each request such that each request is separately identifiable and able to be correlated with its particular outgoing requests/statements sent to the database back-end system 340.

The gateway system 310 sends the incoming user request 315 to the inspection system 330 along with the unique value corresponding to the incoming user request 315. The incoming user request 315 is provided to the inspection system 330 for use in generating a mapping from this incoming user request 315 to resulting outgoing requests/statements 325. The inspection system 330 stores the incoming user request, or at least an identifier of the user request, and its associated unique values as obtained from the user request, and the like, in a mapping specification data structure 336.

The inspection system 330 inspects the outgoing requests/statements 325, e.g., SQL statements, generated by the application front-end 320 based on the incoming user requests 315 received by the application front-end 320. These outgoing requests/statements 325 are parsed by the parser 332 and the mapping logic 334 analyzes the parsed outgoing requests/statements 325 to look specifically for the unique values that were inserted into the incoming user requests 315 that were intercepted by the gateway mechanism 310 prior to the requests being processed by the application-layer application front-end 320. That is, the mapping logic 334 extracts values from the parsed outgoing requests/statements 325 and compares them to a listing of unique values communicated to the inspection system 330 by the gateway system 310 and stored in the mapping specification data structure 336. If there is a matching unique value in the mapping specification data structure 336, then the mapping logic 334 adds the outgoing request/statement 325, or at least an identifier of the outgoing request/statement 325, to a list of outgoing request/statements in the mapping specification data structure 336 for the particular incoming user request 315. This list may be built up with each subsequent outgoing request/statement having a matching unique value is detected by the inspection system 330. The result is a mapping of the incoming user request 315 to the one or more outgoing requests/statements 325 having the same unique value.

The detection of these unique values in the outgoing requests/statements 325 being sent to the back-end database system 340 is correlated with the unique values in the incoming user requests 315. This correlation leads to the generation of a mapping between incoming user requests 315 and the resulting outgoing requests/statements 325. That is, the mapping identifies an input pattern of incoming user requests 315 and a corresponding pattern of output requests/statements 325 based on the inserted or "planted" unique values. The end result is a specification, or set of specifications, on how sequences of incoming user requests 315 are associated with outgoing requests/statements 325. For example, an incoming user request sequence of A, B, C may be mapped to, or causes, a sequence of outgoing requests/statements of X1, X2, X3, X4, X5, X6, and X7 to be generated and thus, a mapping from A, B, C, to X1, X2, X3, X4, X5, X6, and X7 can be established and stored for later use in analyzing accesses to the database back-end.

This process of mapping by the gateway and inspection mechanisms 310 and 330 may be performed for a majority, or even all, of the code paths of the application front-end 320 using a staging or testing environment. For example, there are known mechanisms for testing the various code paths of application code for purposes of verification, tracing, and the like. These mechanisms may be augmented or otherwise utilized with the mechanisms of the illustrative embodiments to generate a mapping of incoming user requests 315 to outgoing requests/statements 325 targeting a database back-end system 340.

It should be noted that the various systems and devices shown in FIG. 3, and the figures hereafter, may be implemented on the same data processing system or on a plurality of different data processing systems. For example, the client computing device 305 may be a separate computing device from the gateway system 310 which may be on a different system from the application front-end system 320, inspection system 330, and database back-end system 340. Alternatively, the gateway system 310 and application front-end system 320 may be implemented on the same data processing system, the inspection system 330 and database back-end system 340 may together be provided on a separate data processing system, and the client computing device 305 may be yet another data processing system. Any combination of elements shown in FIG. 3 may be provided on the same or different data processing systems without departing from the spirit and scope of the illustrative embodiments.

The output of the above mapping process is a specification, or set of specifications, that defines how the application front-end behaves as a sort of "black box." That is, the specification(s) specify, given a set of inputs, the "black box" generates a particular set of outputs. This specification, or set of specifications, can then be used at runtime for auditing accesses to the back-end database system 340. In other words, the specification or set of specifications generated during the learning mode of operation may be input to an auditing mechanism for use in performing audit operations on accesses to a back-end database system 340. The auditing mechanism may operate at the database layer rather than at the application layer. The auditing mechanism may use the mappings in the specification(s) and may further obtain information from the front-end application 320 to thereby identify the particular users or client devices that are accessing sensitive information in the back-end database system 340.

Figure 4:
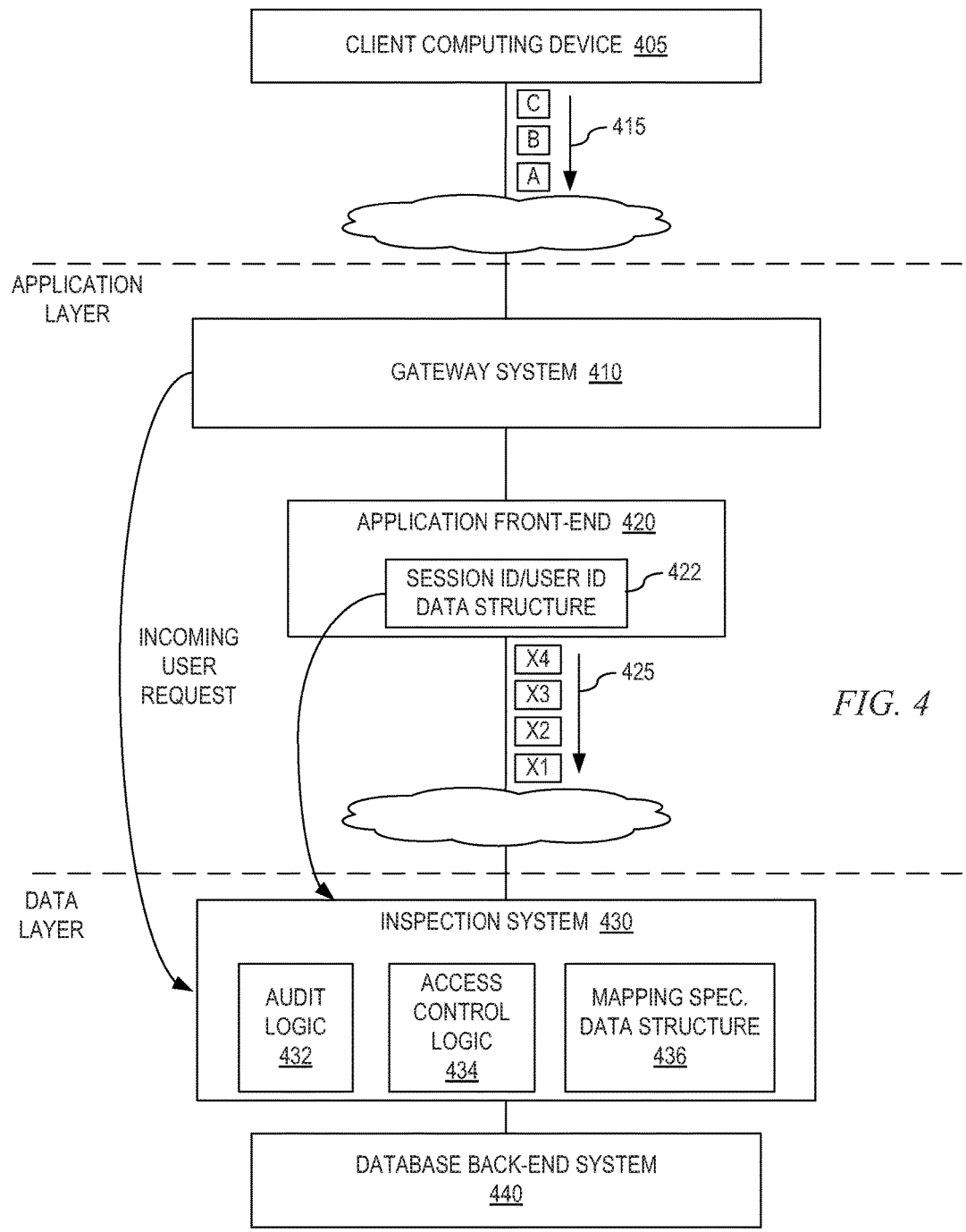
FIG. 4 is an example block diagram of a system for auditing accesses to a back-end system using mapping information generated during a learning mode of operation in accordance with one illustrative embodiment.

FIG. 4 is an example block diagram of a system for auditing accesses to a back-end system using mapping information generated during a learning mode of operation in accordance with one illustrative embodiment. The gateway system 310 and inspection system 330 may be configured to run in a runtime mode of operation such that newly configured gateway system 410 and inspection system 430 are shown in FIG. 4, which correspond to elements 310 and 330 in FIG. 3 but reconfigured for runtime operation. As shown in FIG. 4, the inspection system 430 includes additional runtime components including audit logic 432 and access control logic 434. These elements may make use of the mapping specification data structure 436 which may correspond to the mapping specification data structure 336 in FIG. 3.

During runtime, the gateway system 410 relays incoming user requests to the inspection system 430 in a similar manner as it did during the learning mode of operation. In addition, the front-end application 420 stores the end user credentials and corresponding session identifiers in a user credentials data structure 422 and thus, knows the user credentials associated with the incoming user requests 415. That is, the session identifier, which is included in the incoming user requests 415 by virtue of having established a connection with the application front-end 420 in a known manner, may be used as a basis for identifying the corresponding user credentials stored in this user credentials data structure 422. It should be appreciated that both in the learning mode of operation and the runtime mode of operation, the actual functionality of the application front-end 420 is not changed and there is no need to modify the code of the application front-end 420 to achieve the functionality of the present invention. Thus, the maintaining of session identifiers and user identifiers in the session id/user id data structure 422 does not constitute a change in the operation of the application front-end 420 from that of known application front-end systems. However, the illustrative embodiments utilize this information in a new and different manner during runtime operation.

The incoming user requests 415 relayed by the gateway system 410 to the inspection system 430 during a runtime mode of operation are the same in structure as the incoming user requests 315 relayed during the learning mode of operation. The difference between these requests 315 and 415 is the values within the requests 315 and 415. The requests 315 relayed during the learning mode of operation have their application values replaced with unique values for mapping purposes. The requests 415 relayed during the runtime mode of operation are not modified and thus, have the original application values.

The inspection system 430 not only receives the original incoming user request 415 relayed by the gateway system 410, but also the resulting outgoing requests/statements 425 generated by the processing of the incoming user request 415 by the application front-end 420. The pattern of outgoing requests/statements 425 received in the inspection system 430 may be matched, by the audit logic 432 or access control logic 434, to an entry in the mapping specification data structure 436 to identify a type of incoming user request 415, or in some illustrative embodiments, a pattern of one or more incoming user requests 415, matching the pattern of outgoing requests/statements 425. This type of incoming user request, or pattern of one or more incoming user requests, may then be matched to an actual incoming user request 415 relayed to the inspection system 430. The session identifier in the identified actual incoming user request 415 may be correlated with a user identifier using the session identifier/user identifier data structure 422, which may be accessed by the inspection system 430 or provided to the inspection system 430 by the application front-end 420.

The user identifier may then be used by the audit logic 432 or access control logic 434 to perform appropriate operations in the data layer. For example, the audit logic 432 may generate audit records in an audit record data structure (not shown) that identifies which users accessed which portions of the database back-end system 440 and the requests/statements corresponding to these accesses from a data layer perspective. The access control logic 434 may control access to the database back-end system 440 based on the identified user. In one example, if the database back-end system 440 detects a data leak scenario, the access control logic 434 may use the mapping specification data structure 436 information and the correlation mechanisms described above to instruct the application front-end 420 to terminate the user session, based on the session identifier.

For example, assume that while inspecting the database access layer, the mechanisms of the inspection system 430 notices a SQL injection attack that causes a large set of records to be extracted from the database back-end system 440 as the result set of the query that was created by the SQL injection attack. In this case, the database back-end system 440 may not want to terminate the database connection with the application front-end system 420 because it is used by the application front-end server. However, with the mechanisms of the illustrative embodiments, the inspection system 430 knows which user request generated the query that resulted in the SQL injection attack using the mechanisms described above. Thus, the access control logic 434 of the inspection system 430 may operate to prevent the returning of the large number of records to the attacker as part of the SQL injection attack by instructing the gateway system 410 to tear down the connection between the client computing device 405 and the application front-end system 420.

It is important to note that, in this case, the identification of the attack occurs is on one layer (in a SQL injection attack or a large data extract the layer where this would be seen is data layer) but the layer in which termination needs to occur is in a different layer (in this case the application layer). Known mechanisms try to identify attacks and terminate these attacks in the same layer which causes errors and is generally faulty. The ability to identify an attack in one layer but have a deterministic and precise mapping to the another layer so that one can effect good termination of the attack is a significant benefit provided by the mechanisms of the illustrative embodiments.

Thus, the illustrative embodiments provide mechanisms for propagating user identifier information from an application front-end system in an application layer to data layer mechanisms, e.g., audit and/or access control mechanisms, operating in a data layer. In this way, data layer mechanisms may correlate accesses to back-end systems with particular user identifiers rather than functional identifiers of the application front-end system. As a result, accurate audits can be performed at the data layer and access control functions can be performed based on the user identifier information for connections rather than the functional identifier of the application front-end system.

Figure 5:
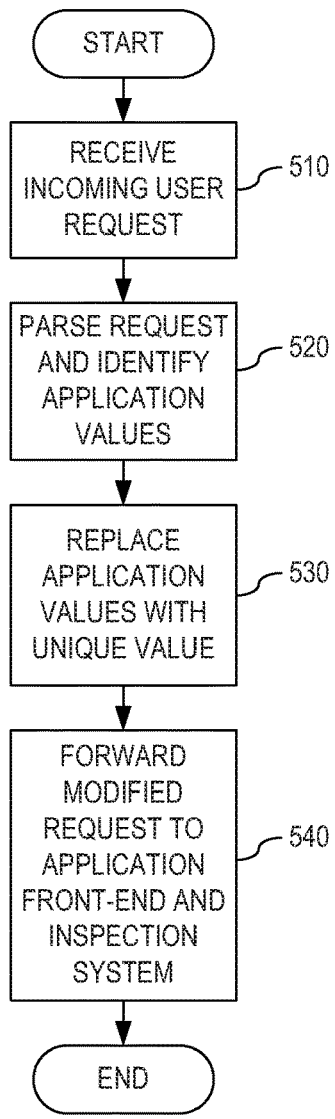
FIG. 5 is a flowchart outlining an example operation of a gateway system during a learning mode of operation in accordance with one illustrative embodiment.

FIG. 5 is a flowchart outlining an example operation of a gateway system during a learning mode of operation in accordance with one illustrative embodiment. As shown in FIG. 5, the gateway system receives an incoming user request from a client computing device (step 510). The gateway system then parses the request and identifies any application values in the request that are likely to be passed through the application front-end system in outgoing requests/statements to a back-end system (step 520). The identified application values are then replaced with a uniquely identifiable value (step 530). The resulting modified request is forwarded to the application front end and the inspection system (step 540). The operation of the gateway system with regard to this received incoming user request is then ended. It should be appreciated that this process may be repeated for each subsequently received incoming user request during a learning mode of operation. Although not shown in FIG. 5, the application front-end receives the modified request and processes it in a normal fashion so as to generate outgoing request(s)/statement(s) that target a back-end system, e.g., a back-end database system or the like.

Figure 6:
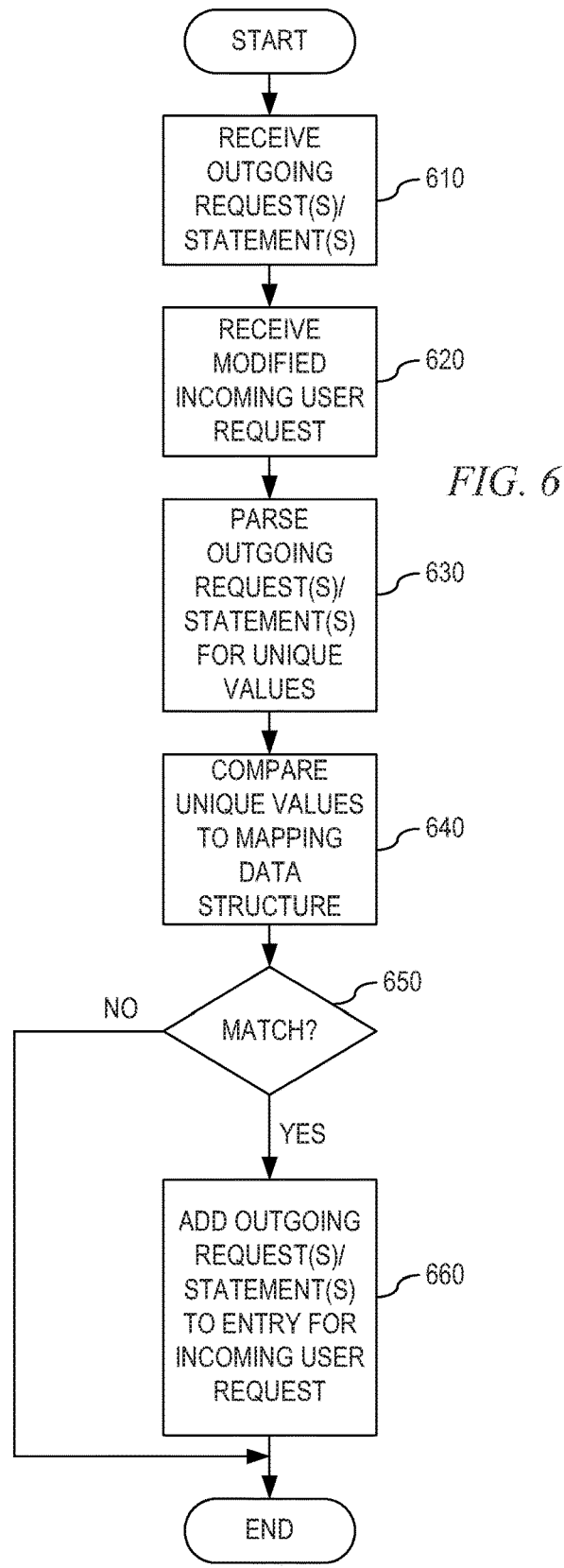
FIG. 6 is a flowchart outlining an example operation of an inspection system during a learning mode of operation in accordance with one illustrative embodiment.

FIG. 6 is a flowchart outlining an example operation of an inspection system during a learning mode of operation in accordance with one illustrative embodiment. As shown in FIG. 6, the operation starts with the inspection system receiving outgoing request(s)/statement(s) generated by a front-end application system (step 610) and a modified incoming user request as forwarded by the gateway system (step 620). The outgoing request(s)/statement(s) are parsed for the unique values (step 630) and any found unique values are compared to those stored in the mapping data structure (step 640). If there is a matching entry found in the mapping data structure 640 based on the unique values (step 650), then the outgoing request(s)/statement(s) are added to the matching entry for the particular corresponding incoming user request (step 660). If there is not a match, then the operation terminates. It should be appreciated that this process can be repeated for each new outgoing request/statement or group of request(s)/statement(s) received by the inspection system.

The above process generates a mapping data structure that maps incoming user request patterns to outgoing request/statement patterns which may then be used during runtime to propagate user identifier information to back-end audit, access control, and other back-end processes. The gateway system and inspection system may be reconfigured to a runtime mode of operation to perform such pattern matching.

Figure 7:
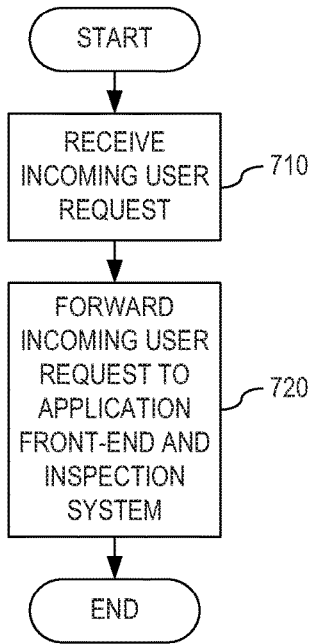
FIG. 7 is a flowchart outlining an example operation of a gateway system during a runtime mode of operation in accordance with one illustrative embodiment.

FIG. 7 is a flowchart outlining an example operation of a gateway system during a runtime mode of operation in accordance with one illustrative embodiment. As shown in FIG. 7, the gateway system receives an incoming user request (step 710) and then simply forwards the incoming user request to the application front-end system and inspection system (step 720). Thus, in a runtime mode of operation, the gateway system operates primarily as a pass-through entity with the exception that the gateway system forwards the incoming user request to the inspection system as well as the application front-end.

Figure 8:
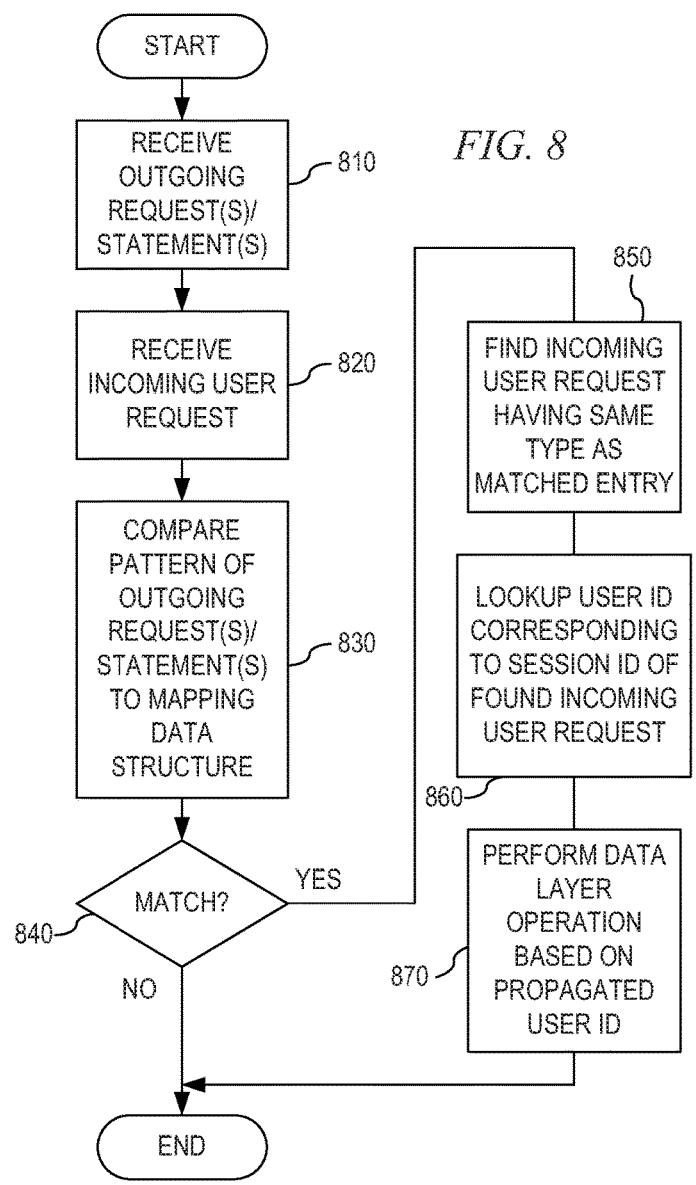
FIG. 8 is a flowchart outlining an example operation of an inspection system during a runtime mode of operation in accordance with one illustrative embodiment.

FIG. 8 is a flowchart outlining an example operation of an inspection system during a runtime mode of operation in accordance with one illustrative embodiment. As shown in FIG. 8, the inspection system receives outgoing request(s)/statement(s) from the application front-end system (step 810) and the original incoming user request from the gateway system (step 820). The inspection system compares the pattern of outgoing request(s)/statement(s) to entries in the mapping data structure to identify a match (step 830). This match may not necessarily be a precise match but instead may be a match within a given tolerance. That is, the pattern in the entry may differ from the pattern of the received outgoing requests by a predetermined acceptable amount, i.e. a tolerance, and still be considered to be a match.

If there are no matching entries, the operation terminates. However, it should be appreciated that this process may be repeated for each subsequently received outgoing request/statement or group of outgoing requests/statements.

If there is a matching entry found (step 840), then an incoming user request having the same type, or pattern of one or more incoming user requests, as the matched entry is identified (step 850). A lookup operation is performed, based on the session identifier of the matched incoming user request, to identify a user identifier corresponding to the matched incoming user request (step 860). A data layer operation is then performed based on the propagated user identifier information (step 870). For example, this data layer operation may include an audit mechanism generating an audit record using the user identifier information propagated using the mechanisms of the illustrative embodiments. As another example, access control mechanisms may control access to data in the back-end system based on this user identifier information or may instruct the application front-end to modify connections based on this user identifier information. Other types of data layer operations may be performed without departing from the spirit and scope of the illustrative embodiments.

Thus, the mechanisms of the illustrative embodiments allow propagation of user identifier information from an application layer to a data layer so that analysis of the data layer operations can be performed within the context of this user identifier information. As mentioned previously, with known mechanisms, this user identifier information is lost at the data layer and is not accurately obtainable. The mechanisms of the illustrative embodiments utilize a learning process based on unique values to generate pattern matching specifications that can accurately correlate patterns of outgoing requests/statements with incoming user requests without modifying the operation or code of the application front-end and back-end systems.

It should be appreciated that while the illustrative embodiments are described in terms of propagating user identifier information, the illustrative embodiments are not limited to such. Rather, any information that is available in one layer of processing that may be of interest to another layer of processing may be propagated using the mechanisms of the illustrative embodiments. For example, with regard to security, other types of information that may be propagated using the mechanisms of the illustrative embodiments include client IP address, host name, operating system user name logged on at the client, or any other information that can assist in identifying who and from where a request is being made.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
receiving, by a gateway computing system, a plurality of first application requests relating to a first application;
in response to receiving the plurality of first application requests, processing, by the gateway computing system, each first application request in the plurality of first application requests at least by:
parsing the first application request to identify at least one application value in the first application request;
replacing the at least one application value in the first application request with a uniquely identifiable value to generate a modified first application request; and
processing the modified first application request through the gateway computing system;
subsequent to each first application request, receiving, by the gateway computing system and from a first database tier of a first database in a database computing system, a respectively corresponding plurality of database requests relating to access of data of the first database tier by the first application;
determining, by machine logic of the gateway computing system, a first mapping between the first application and a first mapped plurality of database requests, with the determination being based upon the plurality of first application requests and the plurality of database requests respectively corresponding to each first application request as determined from monitoring, by the gateway computing system, the received plurality of database requests, for the uniquely identifiable values associated with the first application requests in the plurality of first application requests;
receiving, at a data layer inspection system associated with the database computing system, an incoming user request from the gateway computing system;
receiving, at the data layer inspection system, one or more database requests targeting the first database and being generated by an application front-end system based on the received incoming user request;
accessing, by the data layer inspection system, a mapping data structure comprising the first mapping, based on the one or more database requests to thereby correlate the one or more database requests with the incoming user request, wherein the correlation is performed at least by matching a pattern of the one or more database requests to an entry in the mapping data structure, wherein each entry in the mapping data structure maps a pattern of database requests to a corresponding type of incoming user request;
retrieving, by the data layer inspection system, source identification information associated with the incoming user request based on the correlation of the one or more database requests with the incoming user request; and
performing, by the data layer inspection system, a data layer inspection operation based on the source identification information.

2. The method of claim 1 further comprising:
responsive to the first mapping, propagating, by the gateway and to a plurality of system components, first identity propagation data including information indicative of: (i) an identity of the first application, and (ii) causation of operation(s) in the first database tier by the first application.

3. The method of claim 2 wherein:
the identity of the first application includes user credentials corresponding to a first user; and
the first identity propagation data includes information identifying the first user.

4. The method of claim 1, wherein accessing the mapping data structure comprises performing a lookup of an entry in the mapping data structure that has a pattern of database requests that matches a pattern of the received one or more database requests.

5. The method of claim 4, wherein accessing the mapping data structure further comprises:
retrieving a type or pattern of one or more incoming user requests specified in the entry; and
matching a type or pattern of the received incoming user request to a retrieved type or pattern specified in the entry.

6. The method of claim 1, wherein database requests having the uniquely identifiable value are added to an entry in a mapping data structure corresponding to the first application request, and wherein a series of database requests stored in the entry corresponding to the first application request constitute a pattern of database requests.

7. The method of claim 1, wherein the data layer inspection operation is a data layer audit operation that generates an audit log of accesses to the back-end system, and wherein the audit log comprises the source identification information.

8. The method of claim 1, wherein the incoming user request is a hypertext transport protocol (HTTP) request targeting an application front-end system, and the database requests are Structured Query Language (SQL) statements generated by the application front-end system based on the HTTP request.

9. A computer program product comprising a non-transitory computer readable medium having a computer readable program stored therein, wherein the computer readable program, when executed on a computing device, causes the computing device to:
receive, by a gateway executing on the computing device, a plurality of first application requests relating to a first application;
process, by the gateway in response to receiving the plurality of first application requests, each first application request in the plurality of first application requests at least by:
parsing the first application request to identify at least one application value in the first application request;
replacing the at least one application value in the first application request with a uniquely identifiable value to generate a modified first application request; and
processing the modified first application request through the gateway;
subsequent to each first application request, receive, by the gateway and from a first database tier of a first database in a database computing system, a respectively corresponding plurality of database requests relating to access of data of the first database tier by the first application;
determine, by machine logic of the gateway, a first mapping between the first application and a first mapped plurality of database requests, with the determination being based upon the plurality of first application requests and the plurality of database requests respectively corresponding to each first application request as determined from monitoring, by the gateway, the received plurality of database requests, for the uniquely identifiable values associated with the first application requests in the plurality of first application requests;
receive, at a data layer inspection system associated with the database computing system, an incoming user request from the gateway computing system;
receive, at the data layer inspection system, one or more database requests targeting the first database and being generated by an application front-end system based on the received incoming user request;
access, by the data layer inspection system, a mapping data structure comprising the first mapping, based on the one or more database requests to thereby correlate the one or more database requests with the incoming user request, wherein the correlation is performed at least by matching a pattern of the one or more database requests to an entry in the mapping data structure, wherein each entry in the mapping data structure maps a pattern of database requests to a corresponding type of incoming user request;
retrieve, by the data layer inspection system, source identification information associated with the incoming user request based on the correlation of the one or more database requests with the incoming user request; and
perform, by the data layer inspection system, a data layer inspection operation based on the source identification information.

10. The computer program product of claim 9 wherein the computer readable program further causes the computing device to:
responsive to the first mapping, propagate, by the gateway and to a plurality of system components, first identity propagation data including information indicative of: (i) an identity of the first application, and (ii) causation of operation(s) in the first database tier by the first application.

11. The computer program product of claim 10 wherein:
the identity of the first application includes user credentials corresponding to a first user; and
the first identity propagation data includes information identifying the first user.

12. A system comprising:
at least one processor; and
at least one memory coupled to the at least one processor, wherein the at least one memory comprises instructions executed by the at least one processor that cause the at least one processor to:
receive, by a gateway executing on the at least one processor, a plurality of first application requests relating to a first application;
process, by the gateway, in response to receiving the plurality of first application requests, each first application request in the plurality of first application requests at least by:
parsing the first application request to identify at least one application value in the first application request;
replacing the at least one application value in the first application request with a uniquely identifiable value to generate a modified first application request; and
processing the modified first application request through the gateway;
subsequent to each first application request, receiving, by the gateway and from a first database tier of a first database in a database computing system, a respectively corresponding plurality of database requests relating to access of data of the first database tier by the first application;
determining, by machine logic of the gateway, a first mapping between the first application and a first mapped plurality of database requests, with the determination being based upon the plurality of first application requests and the plurality of database requests respectively corresponding to each first application request as determined from monitoring, by the gateway, the received plurality of database requests, for the uniquely identifiable values associated with the first application requests in the plurality of first application requests;

receiving, at a data layer inspection system associated with the database computing system, an incoming user request from the gateway computing system;

receiving, at the data layer inspection system, one or more database requests targeting the first database and being generated by an application front-end system based on the received incoming user request;

accessing, by the data layer inspection system, a mapping data structure comprising the first mapping, based on the one or more database requests to thereby correlate the one or more database requests with the incoming user request, wherein the correlation is performed at least by matching a pattern of the one or more database requests to an entry in the mapping data structure, wherein each entry in the mapping data structure maps a pattern of database requests to a corresponding type of incoming user request;

retrieving, by the data layer inspection system, identification information associated with the incoming user request based on the correlation of the one or more database requests with the incoming user request; and performing, by the data layer inspection system a data layer inspection operation based on the source identification information.

13. The system of claim 12 wherein the instructions further cause the at least one processor to:

responsive to the first mapping, propagate, by the gateway and to a plurality of system components, first identity propagation data including information indicative of: (i) an identity of the first application, and (ii) causation of operation(s) in the first database tier by the first application.

14. The system of claim 13 wherein:

the identity of the first application includes user credentials corresponding to a first user; and the first identity propagation data includes information identifying the first user.

\* \* \* \* \*